United States Patent
Hao et al.

(10) Patent No.: US 10,277,418 B2
(45) Date of Patent: *Apr. 30, 2019

(54) METHOD AND DEVICE FOR CLEARING MEDIA ACCESS CONTROL FORWARDING ENTRY

(71) Applicant: Huawei Technologies Co., Ltd., Shenzhen (CN)

(72) Inventors: Weiguo Hao, Nanjing (CN); Yizhou Li, Nanjing (CN); Zhenbin Li, Beijing (CN); Yuanbin Yin, Beijing (CN); Chenglong Ding, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/663,398

(22) Filed: Jul. 28, 2017

(65) Prior Publication Data
US 2017/0331640 A1 Nov. 16, 2017

Related U.S. Application Data
(63) Continuation of application No. 14/562,678, filed on Dec. 6, 2014, now Pat. No. 9,762,410, which is a (Continued)

(30) Foreign Application Priority Data
Jun. 7, 2012 (CN) .......................... 2012 1 0186577

(51) Int. Cl.
*H04B 13/02* (2006.01)
*H04L 12/46* (2006.01)
(Continued)

(52) U.S. Cl.
CPC ........ *H04L 12/462* (2013.01); *H04L 12/4641* (2013.01); *H04L 41/12* (2013.01); *H04L 45/02* (2013.01); *H04L 45/66* (2013.01)

(58) Field of Classification Search
CPC ... H04L 12/462; H04L 12/4641; H04L 41/12; H04L 45/02; H04L 12/56
See application file for complete search history.

(56) References Cited

U.S. PATENT DOCUMENTS
8,879,549 B2 11/2014 Mythilikanth et al.
8,982,733 B2 3/2015 Shekher et al.
(Continued)

FOREIGN PATENT DOCUMENTS
CN 101110747 A 1/2008
CN 101640703 A 2/2010
(Continued)

OTHER PUBLICATIONS
Zhai, H. et al., "RBridge:Pseudonode Nickname draft-hu-trill-pseudonode-nickname-01," TRILL Working Group Internet Draft, Nov. 12, 2011, 19 pages.
(Continued)

*Primary Examiner* — Hanh N Nguyen
(74) *Attorney, Agent, or Firm* — Slater Matsil, LLP

(57) ABSTRACT

The present application provides a method and a device for clearing a MAC forwarding entry. The method includes: detecting, by a first RB, that a topology of a network accessed by a local terminal changes; and sending, by the first RB, a first packet to a second RB, so that the second RB clears a corresponding forwarding entry after receiving the first packet, where the second RB refers to an RB configured with at least one VLAN the same as that of the first RB.

20 Claims, 7 Drawing Sheets

Related U.S. Application Data continuation of application No. PCT/CN2013/076691, filed on Jun. 4, 2013.

(51) Int. Cl.
*H04L 12/24* (2006.01)
*H04L 12/751* (2013.01)
*H04L 12/721* (2013.01)

(56) References Cited

U.S. PATENT DOCUMENTS

| | | | |
|---|---|---|---|
| 9,401,861 B2 | 7/2016 | Mythilikanth et al. | |
| 9,762,410 B2 * | 9/2017 | Hao | H04L 12/462 |
| 2008/0031154 A1 | 2/2008 | Sarosh et al. | |
| 2010/0027543 A1 | 2/2010 | Sunesh et al. | |
| 2010/0128728 A1 | 5/2010 | Guanguy et al. | |
| 2011/0299536 A1 | 12/2011 | Cheng et al. | |
| 2014/0177475 A1 | 6/2014 | Xu et al. | |

FOREIGN PATENT DOCUMENTS

| | | |
|---|---|---|
| CN | 101834774 A | 9/2010 |
| CN | 102088415 A | 6/2011 |
| CN | 102142931 A | 8/2011 |
| CN | 102185782 A | 9/2011 |
| CN | 102394819 A | 3/2012 |
| CN | 102957620 A | 3/2013 |
| EP | 2658172 A1 | 10/2013 |
| EP | 2738997 A1 | 6/2014 |
| WO | 2010141064 A1 | 12/2010 |
| WO | 2012129921 A1 | 10/2012 |
| WO | 2013029374 A1 | 3/2013 |

OTHER PUBLICATIONS

Perlman, R., "Routing Bridges (RBridges): Base Protocol Specification," Internet Engineering Task Force (IETF), Jul. 2011, 99 pages.

* cited by examiner

METHOD AND DEVICE FOR CLEARING MEDIA ACCESS CONTROL FORWARDING ENTRY

CROSS-REFERENCE TO RELATED APPLICATIONS

This application is a continuation of U.S. patent application Ser. No. 14/562,678, filed on Dec. 6, 2014, which is a continuation of International Application No. PCT/CN2013/076691, filed on Jun. 4, 2013, which claims priority to Chinese Patent Application No. 201210186577.7, filed on Jun. 7, 2012. All of the afore-mentioned patent applications are hereby incorporated by reference in their entireties.

TECHNICAL FIELD

The present application relates to network communications technologies, and in particular, to a method and a device for clearing a media access control (MAC) forwarding entry.

BACKGROUND

The Transparent Interconnection of Lots of Links (TRILL) protocol is a routing protocol based on link state computation on a layer 2 network, a device running the TRILL protocol is referred to as a routing bridge device (RB), and a network including RBs is referred to as a TRILL network (TRILL Campus). Large layer 2 networking can be implemented by using TRILL, which overcomes disadvantages such as low utilization and long convergence time of a conventional layer 2 network.

A conventional layer 2 native Ethernet can access a TRILL network, and to improve reliability of access to the network, a multi-homing access manner is usually used. If a topology of a network accessed by a terminal (End Station, ES) is switched, an RB accessed by a local terminal device may be switched, and if a MAC forwarding entry that is on a remote RB and is used for storing a correspondence between a MAC address and a nickname of an ingress RB cannot be cleared in time, the remote RB may perform forwarding by using an old MAC forwarding entry, which causes a forwarding failure.

SUMMARY

Embodiments of the present application provide a method and a device for clearing a MAC forwarding entry, which are used to clear a MAC forwarding entry in time after a topology of a network accessed by a local terminal changes, so as to avoid a forwarding failure.

According to one aspect, a method for clearing a MAC forwarding entry is provided. The method includes detecting, by a first routing bridge device (RB) of a first network, a change in a topology of a second network accessed by a local terminal, the first RB being an edge RB of the first network, wherein the second network is connected to the first network through the first RB. The method also includes sending, by the first RB, a first packet to a second RB after detecting the change in the topology of the second network, wherein the first packet is used to instruct the second RB to clear a MAC forwarding entry corresponding to a virtual local area network (VLAN) indicated by the first packet, wherein the second RB is configured with at least one VLAN that is configured to the first RB. The first packet is sent through an RBridge channel, and the first packet comprises an Operation, Administration, Maintenance (OAM) channel header and a payload, and wherein the OAM channel header comprises a channel protocol type indicating that the payload is one of a topology change notification (TCN) packet, a topology change (TC) packet, and a MAC flush packet.

According to another aspect, a method for clearing a MAC forwarding entry is provided. The method includes receiving, by a second routing bridge (RB), a first packet, wherein the first packet is sent by a first RB of a first network after the first RB detects a change in a topology of a second network accessed by a local terminal, wherein the first packet is used to instruct the second RB to clear a MAC forwarding entry corresponding to a virtual local area network (VLAN) indicated by the first packet, wherein the second RB is configured with at least one VLAN that is configured to the first RB, wherein the first RB is an edge RB of the first network, wherein the second network is connected to the first network through the first RB. The method also includes clearing, by the second RB, the MAC forwarding entry corresponding to the VLAN according to the first packet. The first packet is sent through an RBridge channel, and the first packet comprises an Operation, Administration, Maintenance (OAM) channel header and a payload, and wherein the OAM channel header comprises a channel protocol type indicating that the payload is one of a topology change notification (TCN) packet, a topology change (TC) packet, and a MAC flush packet.

According to one aspect, a device for clearing a MAC forwarding entry is provided. The device includes a processor; and a computer-readable storage medium storing instructions. The processor is configured to execute the instructions to implement a method, and the method includes detecting a change in a topology of a second network accessed by a local terminal. The method also includes sending a first packet to a second routing bridge (RB) after detecting the change in the topology of the second network, wherein the first packet is used to instruct the second RB to clear a MAC forwarding entry corresponding to a virtual local area network (VLAN) indicated by the first packet, wherein the first packet is sent through an RBridge channel, and the first packet comprises an Operation, Administration, Maintenance (OAM) channel header and a payload, wherein the OAM channel header comprises a channel protocol type indicating that the payload is one of a topology change notification (TCN) packet, a topology change (TC) packet, and a MAC flush packet, wherein the second RB is configured with at least one VLAN that is configured to the device, wherein the device is a first RB and in a first network, wherein the device is configured to forward data packets between the first network and the second network.

According to another aspect, a device for clearing a MAC forwarding entry is provided. The device includes a processor, and a computer-readable storage medium storing instructions. The processor is configured to execute the instructions to implement a method. The method includes receiving a first packet sent by a first routing bridge (RB) in a first network after the first RB detects a change in a topology of a second network accessed by a local terminal, wherein the first packet is used to instruct the device to clear a MAC forwarding entry corresponding to a virtual local area network (VLAN) indicated by the first packet, wherein the first packet is sent through an RBridge channel, and the first packet comprises an Operation, Administration, Maintenance (OAM) channel header and a payload, wherein the OAM channel header comprises a channel protocol type indicating that the payload is one of a topology change notification (TCN) packet, a topology change (TC) packet, and a MAC flush packet, wherein the device is configured with at least one VLAN that is configured to the first RB, wherein the first RB is an edge RB of the first network, wherein the first RB is configured to connect the first network to the second network, and clearing the MAC forwarding entry corresponding to the VLAN according to the first packet.

It can be known from the foregoing technical solutions that, after detecting that a topology of a network accessed by a local terminal changes, a first RB notifies, by using a first packet, a second RB that the topology of the network accessed by the local terminal changes, so that a MAC forwarding entry on the second RB can be cleared quickly, and rapid convergence of TRILL network data traffic can be triggered, thereby ensuring that forwarding is performed smoothly in a data process.

BRIEF DESCRIPTION OF THE DRAWINGS

To describe the technical solutions in the embodiments of the present application more clearly, the following briefly introduces the accompanying drawings required for describing the embodiments. Apparently, the accompanying drawings in the following description show some embodiments of the present application, and persons of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the embodiments of the present application clearer, the following describes the technical solutions in the embodiments of the present application with reference to the accompanying drawings in the embodiments of the present application. Apparently, the described embodiments are a part rather than all of the embodiments of the present application. All other embodiments obtained by persons of ordinary skill in the art based on the embodiments of the present application without creative efforts shall fall within the protection scope of the present application.

Figure 1:
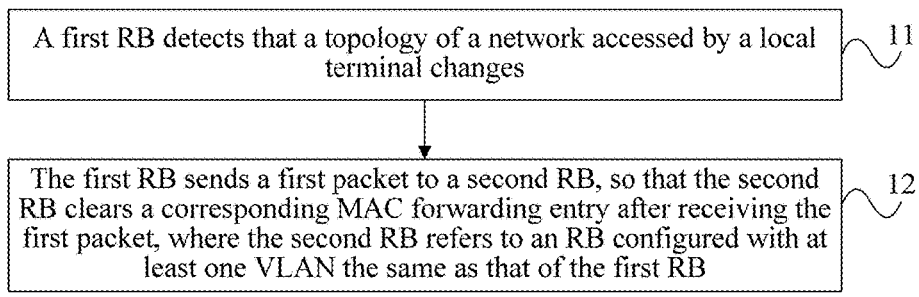
FIG. 1 is a schematic flowchart of an embodiment of a method for clearing a MAC forwarding entry according to the present application.

FIG. 1 is a schematic flowchart of an embodiment of a method for clearing a MAC forwarding entry according to the present application, and the method includes the following steps.

Block 11: A first RB detects that a topology of a network accessed by a local terminal changes.

The first RB may refer to an edge RB of a TRILL network. In a case of multi-homing networking, to avoid a broadcast storm problem caused by that multiple ingress RBs all can forward data traffic, access links of multi-homing networking may be destroyed, so that a conventional layer 2 network can access the TRILL network by using only one access link.

Destruction may be implemented by using an appointed forwarder (AF) mechanism in the TRILL protocol, or, destruction may be implemented by simulating a Spanning Tree Protocol (STP) root bridge by using an edge RB, where the STP refers to an STP, a Rapid Spanning Tree Protocol (RSTP), or a Multi-Instance Spanning Tree Protocol (MSTP) in general.

Figure 2:
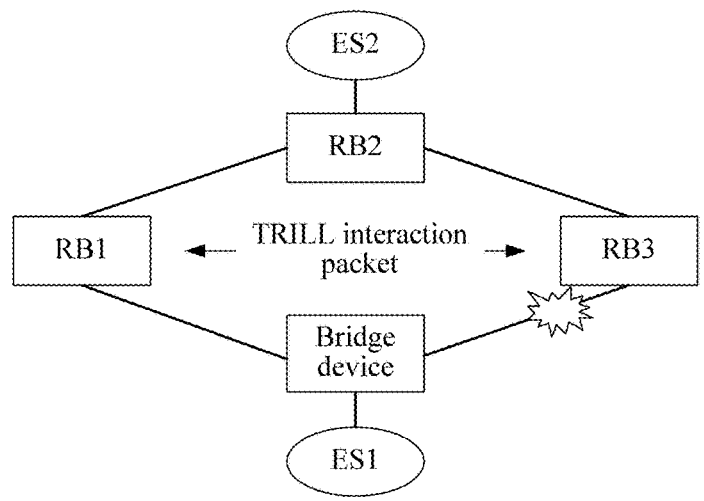
FIG. 2 is a schematic structural diagram of implementing destruction by using an AF mechanism according to the present application.

Refer to FIG. 2, which is a schematic structural diagram of implementing destruction by using an AF mechanism. The TRILL protocol is run between an RB1 and an RB3, and message interaction is performed by using a TRILL interaction packet (which is specifically a TRILL Hello packet); one of the RB1 and the RB3 is appointed as a forwarder corresponding to some virtual local area network (VLAN), and the other RB cannot forward data traffic in the VLAN; therefore, destruction can be implemented. Referring to FIG. 2, destruction of a link between a bridge device (Bridge) and the RB3 is used as an example.

Figure 3:
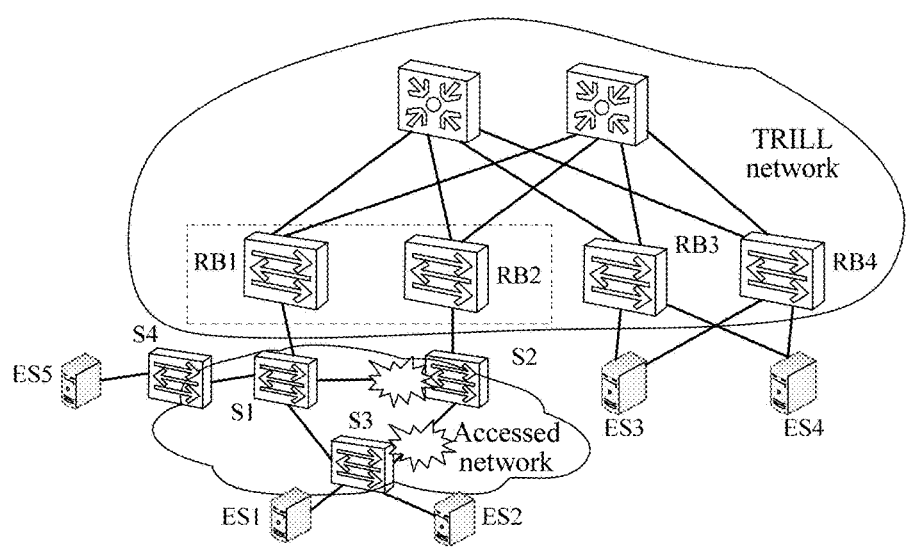
FIG. 3 is a schematic structural diagram of implementing destruction by simulating an STP root bridge by using an edge RB according to the present application.

Refer to FIG. 3, which is a schematic structural diagram of implementing destruction by simulating an STP root bridge by using an edge RB. Referring to FIG. 3, it is assumed that an RB1 and an RB2 access a same STP network, and the RB1 and the RB2 externally present a same bridge ID and bridge priority, where the bridge priority is configured to be the highest priority. For an accessed STP network below including switches S1, S2, S3, and S4, the RB1 and the RB2 are equivalent to one root bridge device, and in this embodiment, a port on the S3 device and connected to the S2 is blocked, and a port on the S2 device and connected to the S1 is blocked.

In a scenario of implementing destruction by using the AF mechanism, after an edge RB detects AF switching, specifically, switching from a non-AF to an AF, it can be construed that a topology of a network accessed by a local terminal changes. For example, after a link failure occurs between the RB1 and the bridge device in FIG. 2, an RB accessed by a terminal is switched from the RB1 to the RB3, and in this case, it can be construed that the topology of the network accessed by the local terminal changes.

In a scenario in which destruction is implemented by simulating an STP root bridge by using an edge RB, when the edge RB receives a topology change notification (TCN) or a topology change (TC) packet from an access port facing a terminal, it can be determined that a topology of a network accessed by the terminal changes. Description is made in the following by using the TCN packet as an example. As shown in FIG. 3, initial blocked ports of an STP network accessed by TRILL are on the S2 device and the S3 device, and are separately a port located on the S2 device and connected to the S1 device, and a port located on the S3 device and connected to the S2 device. ES1 to ES5 belong to a same VLAN, and when a fault occurs on a link between the S1 and the S3, the port on the S3 device and connected to the S2 may change from a blocked state to a forwarding state; in this case, the S3 generates a TCN packet, the TCN packet is sent to the S2 by using a link between the S3 and the S2, and then, the S2 sends the TCN packet to the RB2. Therefore, after an access port of the RB2 receives the TCN packet, it can be determined that the topology of the network accessed by the local terminal changes.

Block 12: The first RB sends a first packet to a second RB, so that the second RB clears a corresponding MAC forwarding entry after receiving the first packet, where the second RB refers to an RB configured with at least one VLAN the same as that of the first RB.

After determining that the topology of the network accessed by the local terminal changes, the first RB can send the first packet to the second RB.

For example, VLANs corresponding to the first RB include a VLAN1 to a VLAN10, and if a VLAN corresponding to an RB other than the first RB includes at least one of the VLAN1 to the VLAN10, the RB is the foregoing second RB.

Optionally, the first packet may be a MAC flush packet, or a TCN packet.

For example, referring to FIG. 2, in the scenario in which destruction is implemented by using the AF mechanism, the RB3 may send a MAC flush packet to the RB2; or, referring to FIG. 3, in the scenario in which destruction is implemented by simulating the STP root bridge by using the edge RB, the RB2 sends a MAC flush packet to the RB3 and an RB4, and the RB2 sends a TCN packet to the RB1.

The first packet may be sent through a data channel, for example, an RB channel. The first packet may be sent in a multicast or broadcast manner; if the multicast manner is used, a destination nickname in a TRILL Header is a nickname of a root of a distribution tree in a TRILL network; if a unicast manner is used, the destination nickname in the TRILL Header is a nickname of a destination-end RB (such as a nickname of the RB1.).

Specifically, when sending is performed in the multicast manner, all second RBs and first RBs need to be on a same distribution tree or a same pruned distribution tree, and the first RB only needs to send one copy of a MAC flush packet or a TCN packet through a multicast TRILL data channel corresponding to the distribution tree or the pruned distribution tree. When sending is performed in the unicast manner, all the second RBs are obtained in advance by searching a link state data base (LSDB) of the whole network, and then, one copy of a MAC flush packet or a TCN packet is separately sent to each second RB through a unicast TRILL channel. In an example where the RB2 sends the first packet, if sending is performed in the multicast manner, the RB2 only needs to send one copy of the first packet; and if the unicast manner is used, the RB2 needs to send one copy of the first packet to each remote RB device. For the multicast manner for sending, the first packet may be sent by using a shared distribution tree, and may also be sent by using a pruned distribution tree based on a VLAN, which needs to ensure that all edge RBs to which the first packet needs to be sent are leaf nodes of the distribution tree or the pruned distribution tree.

Figure 4:
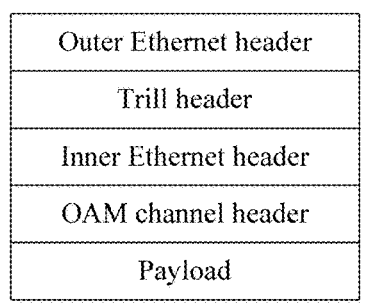
FIG. 4 is a schematic diagram of an encapsulation format of an RB channel according to the present application.

When the first packet is sent in the unicast manner or in the multicast manner by using a distribution tree, for an encapsulation format of an RBridge channel, reference may be made to FIG. 4, and the encapsulation format includes an outer Ethernet header, a Trill header, an inner Ethernet header, an OAM channel header, and a payload. Different from the prior art, two new channel protocol types are added to the OAM channel header, to indicate that a payload part is a TCN packet or a MAC flush packet.

Figure 5:
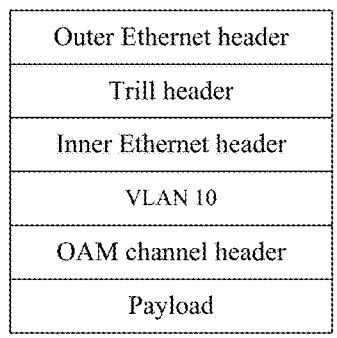
FIG. 5 is a schematic diagram of another encapsulation format of an RB channel according to the present application.

When the first packet is sent in the multicast manner by using a pruned distribution tree, for an encapsulation format of the RBridge channel, reference may be made to FIG. 5. In the example of FIG. 5, all edge RBs to which the first packet needs to be sent join the VLAN 10, and in this case, the encapsulation format is equivalent to that in FIG. 4, and a VLAN 10 field needs to be added.

Optionally, the first RB may also send the first packet to each RB in a same VLAN, and in this case, the RB receiving the first packet may ignore and not process the first packet.

The foregoing MAC forwarding entry includes a correspondence between a MAC address of a terminal and a nickname of an ingress RB. The ingress RB is an edge RB for forwarding data traffic, such as the RB1 in FIG. 2 or FIG. 3.

In addition, after detecting that the topology of the network accessed by the local terminal changes, the first RB clears a local MAC forwarding entry.

In this embodiment, after detecting that a topology of a network accessed by a local terminal changes, a first RB notifies, by using a first packet, a second RB that the topology of the network accessed by the local terminal changes, so that a MAC forwarding entry on the second RB device can be cleared quickly, and rapid convergence of TRILL network data traffic can be triggered.

Figure 6:
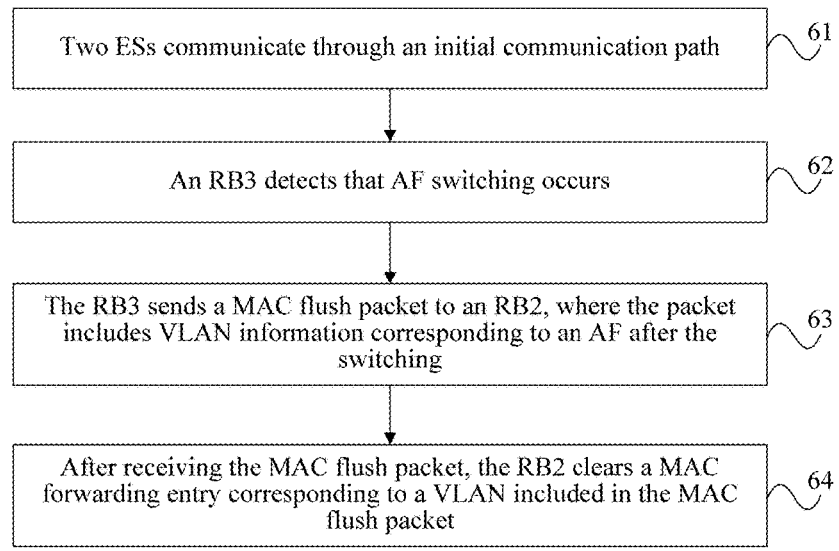
FIG. 6 is a schematic flowchart of another embodiment of a method for clearing a MAC forwarding entry according to the present application.

FIG. 6 is a schematic flowchart of another embodiment of a method for clearing a MAC forwarding entry according to the present application. An application scenario in this embodiment is: implementing an interconnection between a conventional layer 2 network and a TRILL network by using an AF mechanism in the TRILL protocol. This embodiment includes the following steps.

Block 61: Two ESs communicate through an initial communication path.

Figure 7:
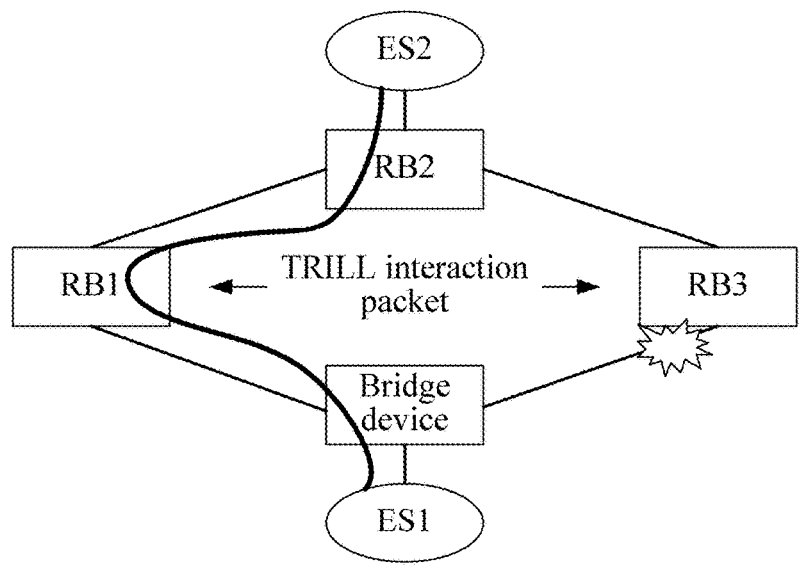
FIG. 7 is a schematic diagram of an initial communication path corresponding to FIG. 6.

Referring to FIG. 7, the two ESs are an ES1 and an ES2 separately. An initial communication path between the ES2 and the ES1 is: ES2→RB2→RB1→Bridge→ES1, that is, a data packet forwarding path shown by a bold line, and bold lines in subsequent figures have the same meaning.

Block 62: An RB3 detects that AF switching occurs.

For example, AF switching is configured, or is triggered after a link between an RB1 and a Bridge encounters a fault. The RB3 can detect the AF switching.

Block 63: The RB3 sends a MAC flush packet to an RB2, where the packet includes VLAN information corresponding to an AF obtained after the switching.

Each RB may determine VLAN information corresponding to the RB, and therefore, after the AF switching is performed, the AF obtained after the switching, for example, the foregoing RB3, may acquire VLAN information corresponding to the AF obtained after the switching, and add the VLAN information to a MAC flush packet.

The VLAN information may be a VLAN list or a VLAN bitmap, and in the VLAN bitmap, each bit indicates one VLAN. The VLAN bitmap can save space compared with the VLAN list.

To clear a MAC forwarding entry corresponding to a VLAN more precisely, the MAC flush packet may not only include the VLAN information, but also include one or more MAC addresses or nicknames which are used for instructing the second RB to clear a MAC forwarding entry matching the VLAN information and the MAC address, or to clear a MAC forwarding entry matching the VLAN and the nickname, that is, to clear a MAC forwarding entry, which includes the MAC address or the nickname, among all MAC forwarding entries corresponding to VLANs indicated by the VLAN information.

When the MAC flush packet includes VLAN information and a nickname, the MAC flush packet is used for instructing the second RB to clear a MAC forwarding entry matching the VLAN and the nickname. In the AF mechanism, the nickname is a nickname of an original RB accessed by a local terminal, for example, in FIG. 7, the nickname is a nickname of an RB1 device. After the AF is switched from the RB1 to the RB3, the second RB (RB2) needs to be notified of clearing a MAC entry in which an ingress RB is the RB1; in a scenario in which an edge RB simulates an STP root bridge, for nicknames of all RBs accessing a same STP domain, for example, in FIG. 12, after a topology of an accessed network changes, the second RB needs to be notified of clearing MAC entries in which ingress RBs are the RB1 and the RB2, and nicknames are nicknames of the RB1 device and the RB2 device. In this case, the MAC flush packet includes content: (VLAN1, nickname list), (VLAN2, nickname list), . . . . The second RB only clears MAC forwarding entries, which are in appointed VLANs, learned from the RBs corresponding to the nicknames.

If MAC addresses corresponding to a local terminal that accesses a network are clearly known, the MAC flush packet may also be used for instructing, by specifying VLAN information and MAC addresses, the second RB to clear corresponding MAC forwarding entries. In this case, the MAC flush packet includes content: (VLAN1, MAC address list), (VLAN2, MAC address list) . . . . The second RB only clears MAC forwarding entries that are in the specified VLANs and include the specified MAC addresses.

Figure 9:
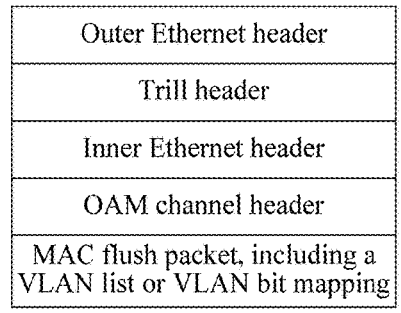
FIG. 9 is a schematic diagram of encapsulation on an RB channel corresponding to FIG. 6.

The MAC flush packet may be sent in a data channel, and the data channel may be an RBridge Channel. Refer to FIG. 9, which is a schematic diagram of a format for sending a MAC flush packet by using a data channel.

In addition, the MAC flush packet may be sent in a unicast or multicast manner. For a specific format of a data channel used when the unicast or multicast manner is used, reference may be made to the foregoing FIG. 4 or FIG. 5.

Block 64: After receiving the MAC flush packet, the RB2 clears a MAC forwarding entry corresponding to the VLAN included in the MAC flush packet.

Specifically, it may be that a forwarding chip of the RB2 sends the MAC flush packet to a control plane of a CPU, and the control plane of the CPU clears a MAC forwarding entry in a corresponding VLAN according to the VLAN information in the MAC flush packet. For example, a MAC flush packet includes a VLAN1 and a VLAN2, and after receiving the MAC flush packet, the RB2 clears a MAC forwarding entry corresponding to the VLAN1 and a MAC forwarding entry corresponding to the VLAN2.

Optionally, the RB3 may also send the MAC flush packet to the RB1, and after receiving the MAC flush packet, the RB1 clears a MAC forwarding entry of a corresponding VLAN. Alternatively, after detecting AF switching, the RB1 may also clear a MAC forwarding entry of the RB1. Alternatively, the RB1 may also wait until the MAC forwarding entry is aged, so as to clear the MAC forwarding entry.

Further, after the MAC forwarding entry is cleared, a new MAC forwarding entry may be learned in the following manner, so that the MAC forwarding entry is updated in time.

The ES2 sends a unicast data packet to the RB2, and after the RB2 receives the layer 2 unicast data packet, because the MAC forwarding entry has been cleared, the RB2 processes the packet as an unknown unicast packet, and sends the packet to the RB1 and the RB3 through a distribution tree.

After receiving the packet, the RB3 performs TRILL decapsulation, learns source MAC address of the ES2, and then sends the packet to a Bridge through an access port. The Bridge also learns the source MAC address of the ES2. Then, the Bridge sends the packet to the ES1.

After receiving the unicast data packet of the ES2, the ES1 responds. A response packet reaches the ES2 through a unicast packet forwarding path, and the forwarding path is ES1→Bridge→RB3→RB2→ES2. The RB2 performs source MAC address learning to learn source MAC address of the ES1, and a source Nickname is a Nickname of the RB3. Similarly, a bridge device may also learn the MAC address of the ES2 and the MAC address of the ES1 when the bridge device receives the foregoing unicast data packet and response packet.

Subsequently, the ES2 and the ES1 can be interconnected by using a unicast process.

Figure 8:
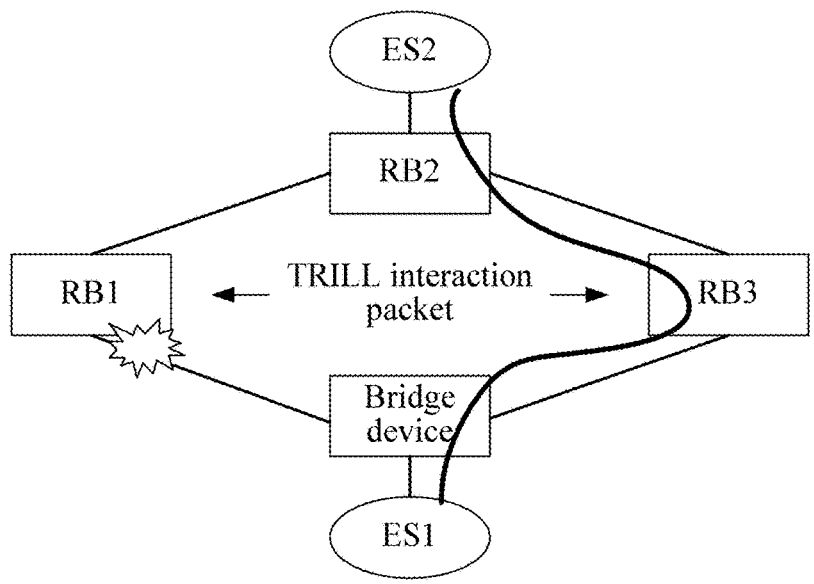
FIG. 8 is a schematic diagram of a communication path after switching corresponding to FIG. 6.

In brief, after the AF switching occurs, referring to FIG. 8, a communication path is switched to be: ES2→RB2→RB3→Bridge→ES1.

In this embodiment, after AF switching is performed, an AF obtained after the switching (which is specifically an RB3) sends a MAC flush packet to a second RB (which is specifically an RB2), and after receiving the MAC flush packet, the RB2 clears a MAC forwarding entry, so that a MAC forwarding entry on the RB2 device can be cleared quickly, and rapid convergence of TRILL network data traffic can be triggered.

Figure 10:
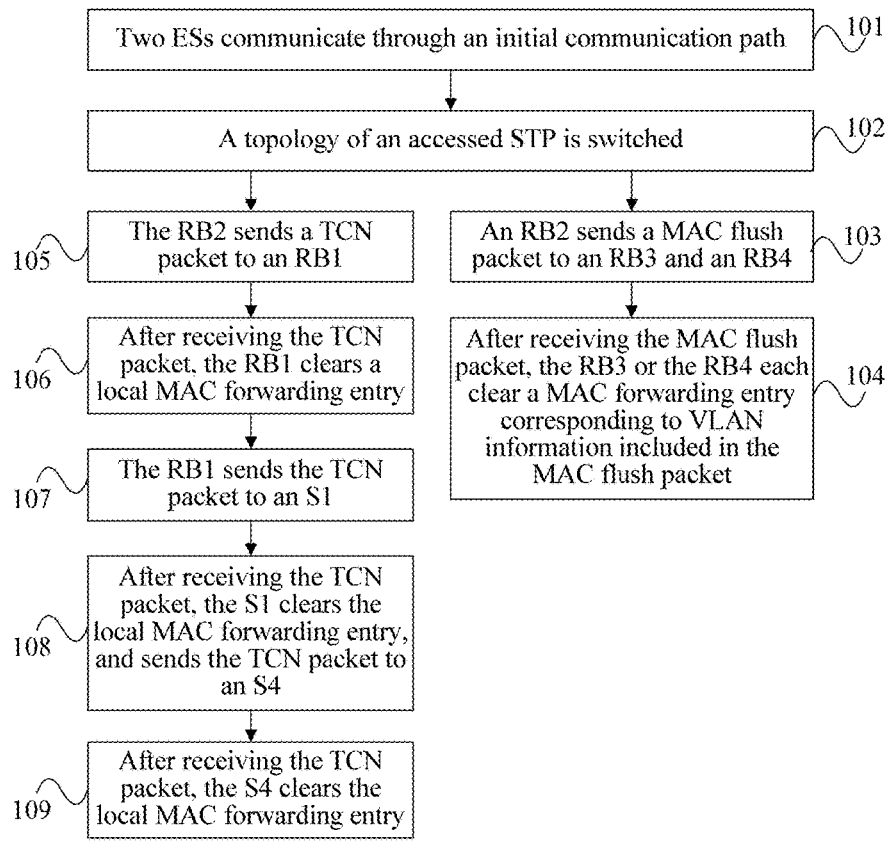
FIG. 10 is a schematic flowchart of another embodiment of a method for clearing a MAC forwarding entry according to the present application.

FIG. 10 is a schematic flowchart of another embodiment of a method for clearing a MAC forwarding entry according to the present application. An application scenario in this embodiment is a scenario in which an interconnection between an STP network and a TRILL network is implemented by simulating an STP root bridge by using an edge RB device. This embodiment includes:

Block 101: Two ESs communicate through an initial communication path.

Figure 11:
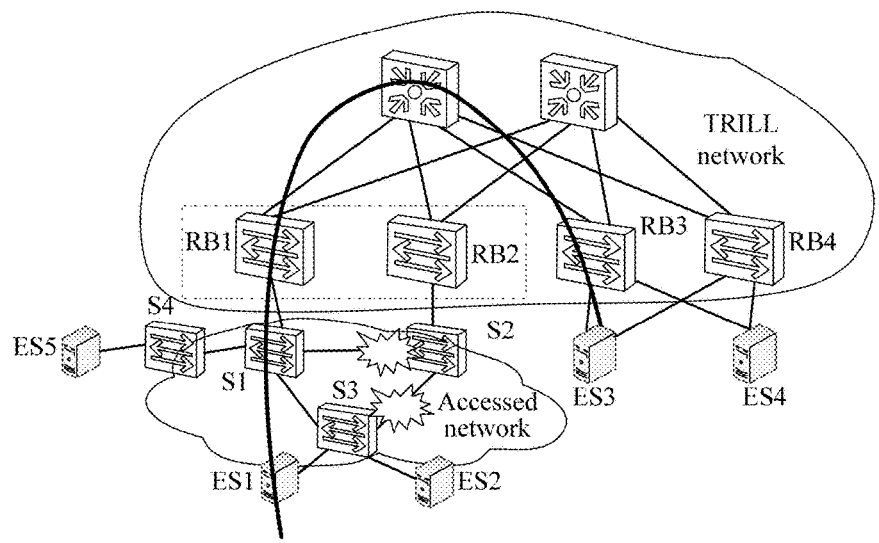
FIG. 11 is a schematic diagram of an initial communication path corresponding to FIG. 10.

Referring to FIG. 11, initial blocked ports of an STP network accessed by TRILL are on an S2 device and an S3 device, and are separately a port located on the S2 device and connected to the S1 device, and a port located on the S3 device and connected to the S2 device. ES1 to ES5 belong to a same VLAN.

The ES5 communicates with the ES1 through S4→S1→S3, and the ES3 communicates with the ES1 through RB3→RB1→S1→S3.

Block 102: A topology of an accessed STP network changes.

When a topology of an accessed STP network changes, for example, a fault occurs on a link between the S1 and the S3, a blocked port of the S3 (S3→S2) is changed to a Forwarding state, and the S3 clears a local MAC forwarding entry, generates a TCN packet, and sends the TCN packet to the S2; after receiving the TCN packet, the S2 clears a local MAC forwarding entry, and then sends the TCN packet to the RB2. After receiving the TCN packet, the RB2 sends the TCN packet to an STP protocol component in the RB2 for processing. The STP protocol component clears a MAC forwarding entry in a local forwarding chip, sends the TCN packet to another RB in a same STP domain, and sends a MAC flush packet to another RB that is not in the same STP domain. That is, the RB2 sends the TCN packet to the RB1; the RB2 sends the MAC flush packet to the RB3 and an RB4, where the MAC flush packet includes VLAN information.

Figure 13:
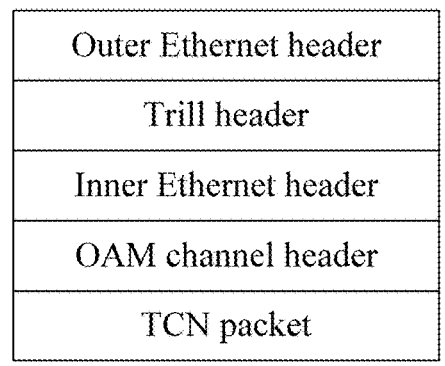
FIG. 13 is a schematic diagram of encapsulation on an RB channel corresponding to FIG. 10.

Both the TCN packet and the MAC flush packet can be sent by using an RBridge channel. For a schematic structural diagram of sending a MAC flush packet by using an RBridge channel, reference may be made to FIG. 9, and for a schematic structural diagram of sending a TCN packet by using an RBridge channel, reference may be made to FIG. 13.

In addition, it should be noted that, in an STP or RSTP scenario, in the embodiment, clearing a local MAC forwarding entry refers to clearing MAC forwarding entries in all VLANs which an access port facing a local terminal joins; in an MSTP scenario, each RB may be corresponding to multiple MSTP instances, and an RB is locally configured with a correspondence between MSTP instances and VLANs; a received TCN packet includes information about an instance. After receiving the TCN packet, the RB can clear a MAC forwarding entry of a VLAN corresponding to the instance. For another example, in an STP scenario, a TCN packet is received, and in an MSTP or RSTP scenario, a TC packet is received.

That is, after block 102, block 103 and block 104 may be included, or, block 105 to block 109 may be included.

Block 103: An RB2 sends a MAC flush packet to an RB3 and an RB4, where the MAC flush packet includes VLAN information.

Block 104: After receiving the MAC flush packet, the RB3 and the RB4 each clear a MAC forwarding entry corresponding to the VLAN information included in the MAC flush packet.

Block 105: The RB2 sends a TCN packet to an RB1.

Block 106: After receiving the TCN packet, the RB1 clears a local MAC forwarding entry.

For example, in the MSTP scenario, after receiving the TCN packet, the RB1 clears a MAC forwarding entry of a VLAN corresponding to an instance indicated by instance information included in the TCN packet. In the STP or RSTP scenario, after receiving the TCN packet, the RB1 clears MAC forwarding entries in all VLANs which the access port facing the local terminal joins, for example, if access VLANs configured on an access port are VLAN100 to VLAN200, after the TCN packet is received, MAC forwarding entries in the VLAN100 to the VLAN200 need to be cleared, where VLANs configured on access ports corresponding to RBs in a same STP domain need to be consistent.

After receiving the MAC flush packet, the RB3 and RB4 each clear the MAC forwarding entry corresponding to the VLAN information included in the MAC flush packet.

Further, after receiving the TCN packet, the RB1 may further instruct another switch device in the same STP domain to clear a MAC forwarding entry. That is, the method may further include:

Block 107: The RB1 sends the TCN packet to an S1.

Block 108: After receiving the TCN packet, the S1 clears a local MAC forwarding entry, and sends the TCN packet to an S4.

Block 109: After receiving the TCN packet, the S4 clears a local MAC forwarding entry.

Further, after the MAC forwarding entry is cleared, a new MAC forwarding entry may be learned in the following manner, so that the MAC forwarding entry is updated in time.

A subsequent communication process between the ES3 and the ES1 is provided in the following descriptions.

The ES3 subsequently communicates with the ES1, and the RB3 receives a layer 2 unicast data packet of the ES3. Because the local MAC entry has been cleared, the layer 2 data packet is used as an unknown unicast packet and sent to all RB devices, including the RB2 device. The RB2 device learns a MAC address of the ES3. At the same time, the RB2 sends the packet to the ES1 through an access port, and after the ES1 receives the packet, the ES1 responds.

The RB2 receives a response packet of the ES1 from the access port. Because destination MAC address is the MAC address of the ES3, unicast TRILL encapsulation is performed by searching a local MAC forwarding entry, then the packet is sent to the RB3, the RB3 learns a MAC address of the ES1, and sends the packet to the ES3. Subsequently, communication between the ES3 and the ES1 is performed in a unicast manner, and a packet forwarding path is changed to RB3→RB2→S2→S3 from the original RB3→RB1→S1→S3.

If the RB3 is not timely notified of an event that the topology of the accessed STP network changes, the RB3 device still reserves an old MAC entry of the ES1, a source Nickname is still a Nickname of the RB1 device; in this case, a unicast packet from the ES3 to the ES1 is sent to the RB1 device; however, because a fault occurs on a link from the S1 to the S3, the RB1 cannot send the packet to the ES1, thereby causing a forwarding failure. Subsequently, only after a MAC entry on the RB3 device is naturally aged, the ES3 can normally communicate with the ES1. The aging time is relatively long, which is generally several minutes. Therefore, by using this solution, TRILL network data forwarding can be rapidly converged.

A subsequent communication process between the ES5 and the ES1 is as follows:

If the ES5 subsequently communicates with the ES1, after the S1 receives a unicast data packet of the ES5, because a MAC entry on the ES5 has been cleared, the ES5 processes the unicast data packet as an unknown unicast packet, and sends the unknown unicast packet to the RB1.

After the RB1 receives the unicast data packet, because the MAC forwarding entry has been cleared, the unicast data packet is processed as an unknown unicast packet. The packet is sent, through a multicast distribution tree, to all other RBs including the RB2.

After receiving the data packet, the RB2 performs TRILL data decapsulation, learns source MAC address of the ES5, and then sends the packet to the S2.

Then, the S2 sends the packet to the S3, and then, the S3 sends the packet to the ES1.

The ES1 subsequently sends a response packet to the ES5 through S3→S2→RB2→RB1→S1, the RB1 learns the source MAC address of the ES1, and a source Nickname is a Nickname of the RB2 device. In this way, after the topology of the accessed STP network changes, the ES5 can normally communicate with the ES1. If the S4 and the S1 do not perceive a topology change event, old MAC entries are still reserved on the S4 device and the S1 device, and a packet from the ES5 to the ES1 is sent to the ES1 through S4→S1→S3. However, because a fault occurs on ES1→ES3, a forwarding failure is caused.

Figure 12:
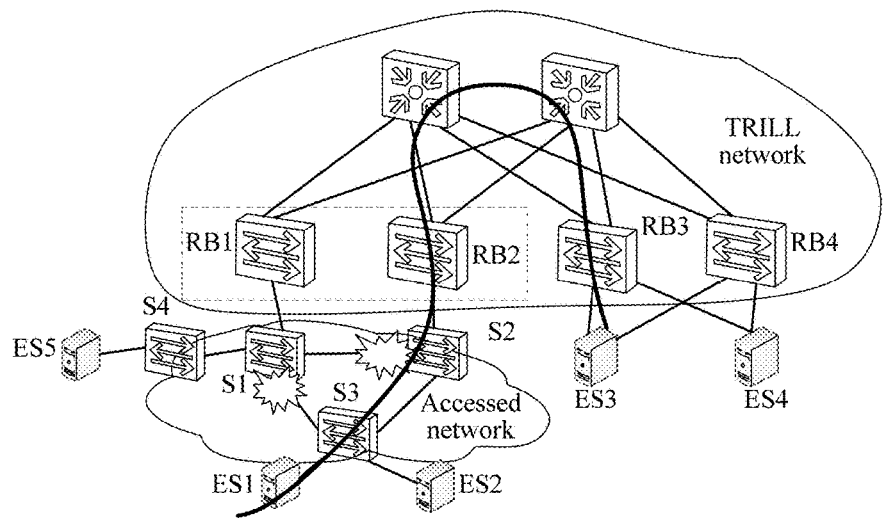
FIG. 12 is a schematic diagram of a communication path after switching corresponding to FIG. 10.

For example, referring to FIG. 12, after a topology of an accessed network changes, the ES3 eventually communicates with the ES1 through RB3→RB2→S2→S3.

In this embodiment, when a topology of a network accessed by a local terminal changes, all nodes in a whole TRILL network timely clear MAC forwarding entries, so as to timely update MAC forwarding entries, thereby triggering rapid convergence of data forwarding. In addition, in this embodiment, in a case in which destruction is performed by simulating an STP root bridge by using a first RB, TCN packets can be flooded to a whole accessed network, so that MAC entries of devices in the whole accessed network are rapidly cleared, thereby triggering rapid convergence of accessed network traffic.

Figure 14:
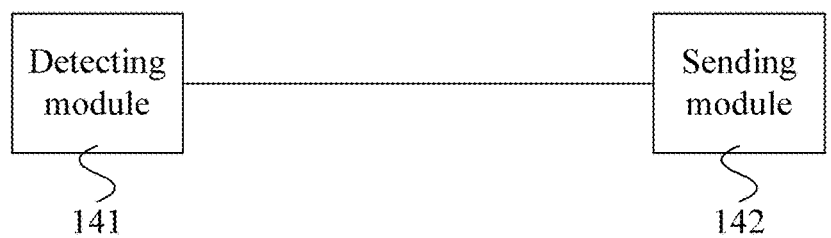
FIG. 14 is a schematic structural diagram of an embodiment of a device for clearing a MAC forwarding entry according to the present application.

FIG. 14 is a schematic structural diagram of an embodiment of a device for clearing a MAC forwarding entry according to the present application. The device may be an edge RB of a TRILL network, and the device includes a detecting module 141 and a sending module 142. The detecting module 141 is configured to detect that a topology of a network accessed by a local terminal changes, and the sending module 142 is configured to send a first packet to a second RB, so that the second RB clears a corresponding MAC forwarding entry after receiving the first packet, where the second RB refers to an RB configured with at least one VLAN the same as that of the device.

Optionally, the detecting module is specifically configured to, after it is detected, in an appointed forwarder AF mechanism, that a device is switched from a non-AF to an AF, determine that the topology of the network accessed by the local terminal changes.

Optionally, the first packet sent by the sending module is a MAC flush packet, and the MAC flush packet includes VLAN information that instructs the second RB to clear a MAC forwarding entry corresponding to the VLAN information.

Optionally, the MAC flush packet may further include one or more MAC addresses or nicknames that instruct the second RB to clear a MAC forwarding entry, which includes the MAC address or nickname, among all MAC forwarding entries corresponding to the VLAN information.

Optionally, the detecting module is specifically configured to, in a mechanism in which the first RB simulates an STP root bridge, when a TCN packet is received from an access port facing the local terminal, determine that the topology of the network accessed by the terminal changes.

Optionally, the first packet sent by the sending module is a TCN packet that instructs the second RB to clear a local MAC forwarding entry, where, in an STP or RSTP scenario, the first packet instructs the second RB to clear MAC forwarding entries in all VLANs which the access port facing the local terminal joins, and in an MSTP scenario, the first packet includes instance information that instructs the second RB to clear a MAC forwarding entry of a VLAN corresponding to the instance information; or, the first packet sent by the sending module is a MAC flush packet, where the MAC flush packet includes VLAN information that instructs the second RB to clear a MAC forwarding entry corresponding to the VLAN information.

Optionally, the first packet is sent through a data channel, and the data channel is an RB channel.

Optionally, the first packet is sent in a multicast manner or a unicast manner. When sending is performed in the multicast manner, the RB channel uses a multicast TRILL data packet encapsulation format; when sending is performed in the unicast manner, the RB channel uses a unicast TRILL data packet encapsulation format.

In this embodiment, after a topology of a network accessed by a local terminal changes, a first packet is used to notify a second RB that the topology of the network accessed by a local terminal changes, so that a MAC forwarding entry on the second RB device can be cleared quickly, and rapid convergence of TRILL network data traffic can be triggered.

Figure 15:
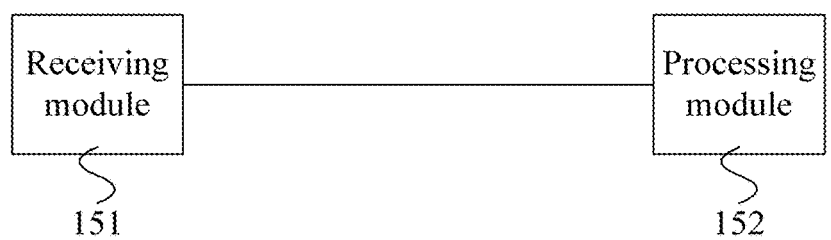
FIG. 15 is a schematic structural diagram of another embodiment of a device for clearing a MAC forwarding entry according to the present application.

FIG. 15 is a schematic structural diagram of another embodiment of a device for clearing a MAC forwarding entry according to the present application. The device may be a remote RB, and the device includes a receiving module 151 and a processing module 152. The receiving module 151 is configured to receive a first packet, where the first packet is sent by a first RB after the first RB detects that a topology of a network accessed by a local terminal changes; and the processing module 152 is configured to clear a corresponding MAC forwarding entry according to the first packet.

Optionally, the first packet is a MAC flush packet, where the MAC flush packet includes VLAN information, and the processing module is specifically configured to clear a MAC forwarding entry corresponding to a VLAN indicated by the VLAN information.

Optionally, the MAC flush packet may further include one or more MAC addresses or nicknames, and the processing module is specifically configured to clear a MAC forwarding entry, which includes the MAC address or nickname, among all MAC forwarding entries corresponding to VLANs indicated by the VLAN information.

Optionally, the first packet is a TCN packet, and the processing module is specifically configured to, in an STP or RSTP scenario, clear MAC forwarding entries in all VLANs which an access port facing the local terminal joins; or, in an MSTP scenario, clear, according to a locally configured correspondence between instances and VLANs and instance information included in the TCN packet, a MAC forwarding entry of a VLAN corresponding to an instance indicated by instance information.

Optionally, the device may further include a sending module, configured to send the TCN packets to another switch device in a same STP domain, so that the another switch device clears a local MAC forwarding entry.

In this embodiment, after a topology of a network accessed by a local terminal changes, the change is learned by using a first packet and a MAC forwarding entry is cleared, so that a MAC forwarding entry on a second RB device can be cleared quickly, and rapid convergence of TRILL network data traffic can be triggered.

Persons of ordinary skill in the art may understand that all or a part of the blocks of the method embodiments may be implemented by a program instructing relevant hardware. The program may be stored in a computer-readable storage medium. When the program runs, the blocks of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present application, but not for limiting the present application. Although the present application is described in detail with reference to the foregoing embodiments, persons of ordinary skill in the art should understand that they may still make modifications to the technical solutions described in the foregoing embodiments or make equivalent replacements to some or all technical features thereof, as long as such modifications or replacements do not cause the essence of corresponding technical solutions to depart from the scope of the technical solutions of the embodiments of the present application.

What is claimed is:

1. A method comprising:
    detecting, by a first routing bridge device (RB) of a first network, a change in a topology of a second network accessed by a local terminal, the first RB being an edge RB of the first network, wherein the second network is connected to the first network through the first RB; and
    sending, by the first RB, a first packet to a second RB after detecting the change in the topology of the second network, wherein the first packet is used to instruct the second RB to clear a media access control (MAC) forwarding entry corresponding to a virtual local area network (VLAN) indicated by the first packet, and wherein the second RB is configured with at least one VLAN that is configured to the first RB; and
    wherein the first packet is sent through an RBridge channel, and the first packet comprises an Operation, Administration, Maintenance (OAM) channel header and a payload, and wherein the OAM channel header comprises a channel protocol type indicating that the payload is a topology change notification (TCN) packet, a topology change (TC) packet, or a MAC flush packet.

2. The method according to claim 1, wherein, in an appointed forwarder (AF) mechanism, detecting the change in the topology comprises detecting, by the first RB, that the first RB is switched from a non-AF to an AF.

3. The method according to claim 2, wherein the first packet is the MAC flush packet, and the MAC flush packet comprises VLAN information that instructs the second RB to clear the MAC forwarding entry corresponding to the VLAN information.

4. The method according to claim 3, wherein the MAC flush packet further comprises:
    a MAC address of the local terminal that is used to instruct the second RB to clear the MAC forwarding entry, the MAC forwarding entry corresponding to the VLAN information and comprising the MAC address; or
    a nickname of an RB that is used for instructing the second RB to clear the MAC forwarding entry, the MAC forwarding entry corresponding to the VLAN information and comprising the nickname.

5. The method according to claim 1, wherein, in a mechanism in which the first RB simulates a Spanning Tree Protocol (STP) root bridge, detecting the change in the topology comprises receiving, by the first RB, a first topology change notification (TCN) packet or a first topology change (TC) packet from an access port facing the local terminal.

6. The method according to claim 5, wherein, when the second RB and the first RB are located in a same STP domain, the first packet is the TCN packet or the TC packet, and the first packet is used to instruct the second RB to clear a local MAC forwarding entry.

7. The method according to claim 5, wherein the method is applied in at least one of the following scenarios:
    an STP scenario, wherein the first packet is used to instruct the second RB to clear MAC forwarding entries in all VLANs which an access port facing the local terminal joins;
    a Rapid Spanning Tree Protocol (RSTP) scenario, wherein the first packet is used to instruct the second RB to clear MAC forwarding entries in all VLANs which an access port connected to the local terminal joins; and
    a Multi-Instance Spanning Tree Protocol (MSTP) scenario, wherein the first packet comprises instance information that instructs the second RB to clear the MAC forwarding entry of the VLAN corresponding to the instance information.

8. The method according to claim 5, wherein, when the second RB is an RB outside an STP domain in which the first RB is located, the first packet is the MAC flush packet that comprises VLAN information that instructs the second RB to clear the MAC forwarding entry corresponding to the VLAN information.

9. The method according to claim 1, wherein the MAC forwarding entry comprises a correspondence between a MAC address of a terminal and a nickname of an ingress RB of the first network.

10. A method comprising:
    receiving, by a second routing bridge (RB), a first packet, wherein the first packet is sent by a first RB of a first network after the first RB detects a change in a topology of a second network accessed by a local terminal, wherein the first packet is used to instruct the second RB to clear a media access control (MAC) forwarding entry corresponding to a virtual local area network (VLAN) indicated by the first packet, wherein the second RB is configured with at least one VLAN that is configured to the first RB, wherein the first RB is an edge RB of the first network, and wherein the second network is connected to the first network through the first RB; and
    clearing, by the second RB, the MAC forwarding entry corresponding to the VLAN according to the first packet; and
    wherein the first packet is sent through an RBridge channel, and the first packet comprises an Operation, Administration, Maintenance (OAM) channel header and a payload, and wherein the OAM channel header comprises a channel protocol type indicating that the payload is a topology change notification (TCN) packet, a topology change (TC) packet, or a MAC flush packet.

11. The method according to claim 10, wherein the first packet is the MAC flush packet that comprises VLAN information and wherein clearing the MAC forwarding entry comprises clearing the MAC forwarding entry corresponding to the VLAN indicated by the VLAN information.

12. The method according to claim 11, wherein the MAC flush packet further comprises:
    a MAC address of the local terminal used to clear the MAC forwarding entry, the MAC forwarding entry comprising the MAC address and corresponding to VLANs indicated by the VLAN information; or
    a nickname of an RB used to clear the MAC forwarding entry, the MAC forwarding entry comprising the nickname and corresponding to VLANs indicated by the VLAN information.

13. The method according to claim 10, when the first packet is the topology change notification (TCN) packet or the topology change (TC) packet, further comprising:
    sending, by the second RB, the TCN packet or the TC packet to another switch device in a same STP domain, so that the another switch device clears a local MAC forwarding entry.

14. The method according to claim 10, wherein clearing the MAC forwarding entry comprises:
   in a Spanning Tree Protocol (STP) scenario, clearing MAC forwarding entries in all VLANs which an access port facing the local terminal joins; or
   in a Rapid Spanning Tree Protocol (RSTP) scenario, clearing MAC forwarding entries in all VLANs which an access port connected to the local terminal joins; or
   in a Multi-Instance Spanning Tree Protocol (MSTP) scenario in which the TCN packet or the TC packet comprises instance information, clearing, according to the instance information and a locally configured correspondence between instances and VLANs, the MAC forwarding entry of a VLAN corresponding to an instance indicated by the instance information.

15. A device comprising:
a processor; and
a computer-readable storage medium storing instructions; and
wherein the processor is configured to execute the instructions to implement a method comprising:
   detecting a change in a topology of a second network accessed by a local terminal; and
   sending a first packet to a second routing bridge (RB) after detecting the change in the topology of the second network, wherein the first packet is used to instruct the second RB to clear a media access control (MAC) forwarding entry corresponding to a virtual local area network (VLAN) indicated by the first packet, wherein the first packet is sent through an RBridge channel, and the first packet comprises an Operation, Administration, Maintenance (OAM) channel header and a payload, wherein the OAM channel header comprises a channel protocol type indicating that the payload is a topology change notification (TCN) packet, a topology change (TC) packet, or a MAC flush packet, wherein the second RB is configured with at least one VLAN that is configured to the device, wherein the device is a first RB and in a first network, and wherein the device is configured to forward data packets between the first network and the second network.

16. The device according to claim 15, wherein detecting the change in the topology comprises, after detecting, in an appointed forwarder (AF) mechanism, that the device is switched from a non-AF to an AF, determining that the topology of the second network accessed by the local terminal changes.

17. The device according to claim 16, wherein the first packet is the MAC flush packet that comprises VLAN information instructing the second RB to clear the MAC forwarding entry corresponding to the VLAN information.

18. The device according to claim 15, wherein the device is configured to operate in at least one of the following scenarios:
   an STP scenario, wherein the first packet is used to instruct the second RB to clear MAC forwarding entries in all VLANs which an access port facing the local terminal joins;
   a Rapid Spanning Tree Protocol (RSTP) scenario, wherein the first packet is used to instruct the second RB to clear MAC forwarding entries in all VLANs which an access port connected to the local terminal joins; or
   a Multi-Instance Spanning Tree Protocol (MSTP) scenario, wherein the first packet comprises instance information that instructs the second RB to clear the MAC forwarding entry of the VLAN corresponding to the instance information.

19. A device comprising:
a processor; and
a computer-readable storage medium storing instructions; and
wherein the processor is configured to execute the instructions to implement a method comprising:
   receiving a first packet sent by a first routing bridge (RB) in a first network after the first RB detects a change in a topology of a second network accessed by a local terminal, wherein the first packet is used to instruct the device to clear a media access control (MAC) forwarding entry corresponding to a virtual local area network (VLAN) indicated by the first packet, wherein the first packet is sent through an RBridge channel, and the first packet comprises an Operation, Administration, Maintenance (OAM) channel header and a payload, wherein the OAM channel header comprises a channel protocol type indicating that the payload is a topology change notification (TCN) packet, a topology change (TC) packet, or a MAC flush packet, wherein the device is configured with at least one VLAN that is configured to the first RB, wherein the first RB is an edge RB of the first network, and wherein the first RB is configured to connect the first network to the second network; and
   clearing the MAC forwarding entry corresponding to the VLAN according to the first packet.

20. The device according to claim 19, wherein the first packet is the MAC flush packet that comprises virtual local area network (VLAN) information and the method further comprises clearing the MAC forwarding entry corresponding to the VLAN indicated by the VLAN information.

* * * * *